United States Patent [19]

Lamb et al.

[11] 4,209,891

[45] Jul. 1, 1980

[54] APPARATUS AND METHOD FOR POSITIONING ONE PART RELATIVE TO ANOTHER PART

[75] Inventors: Raymond K. Lamb; Richard E. Weathers; Lacey C. Coffey; Stephen J. Walker, all of Houston, Tex.

[73] Assignee: NL Industries, Inc., New York, N.Y.

[21] Appl. No.: 925,515

[22] Filed: Jul. 17, 1978

[51] Int. Cl.² ................... E21B 43/01; E21B 33/035
[52] U.S. Cl. .................................. 29/466; 166/341; 285/24; 29/236
[58] Field of Search ............. 29/464, 466, 236, 237; 166/341; 285/24, 27, DIG. 14

[56] References Cited

U.S. PATENT DOCUMENTS

| | | | |
|---|---|---|---|
| 3,105,035 | 9/1963 | Weems | 285/24 X |
| 3,485,051 | 12/1969 | Watkins | 29/464 X |
| 3,688,840 | 9/1972 | Curington et al. | 166/341 |
| 3,741,296 | 6/1973 | Murman et al. | 166/341 X |
| 4,031,544 | 6/1977 | Lapetina | 166/341 |
| 4,060,298 | 11/1977 | Gearin | 285/DIG. 14 |
| 4,077,472 | 3/1978 | Gano | 166/315 |

*Primary Examiner*—Milton S. Mehr
*Attorney, Agent, or Firm*—William E. Johnson, Jr.; Michael O. Sutton

[57] ABSTRACT

Apparatus for positioning a first part with respect to a second part is characterized by a cylindrical guide respectively attachable to each part, a helical surface being disposed on each guide, each helical surface including a right hand half and a left hand half. A piston-cylinder is disposed on the second part, the piston being extendable to engage the guide on the first part to axially align the guides. After alignment, the piston is retractable to bring the helical surfaces into contact to generate a torque and align the parts. In another embodiment, the guide for the second part is formed on the piston while the guide on the first part has an axial alignment member projecting therefrom to engage the guide on the second part to align the guides. Once aligned, the helical surfaces contact each other with the piston extended. The contact between the helical surfaces causes the rotational alignment of the second part with respect to the first part. The piston is then retracted, thereby causing respective mating elements of the first part and the second part to engage. The force of gravity is preferably used to bring the helical surfaces together and thereby cause a rotational torque to be applied to the second part relative to the first part.

25 Claims, 9 Drawing Figures

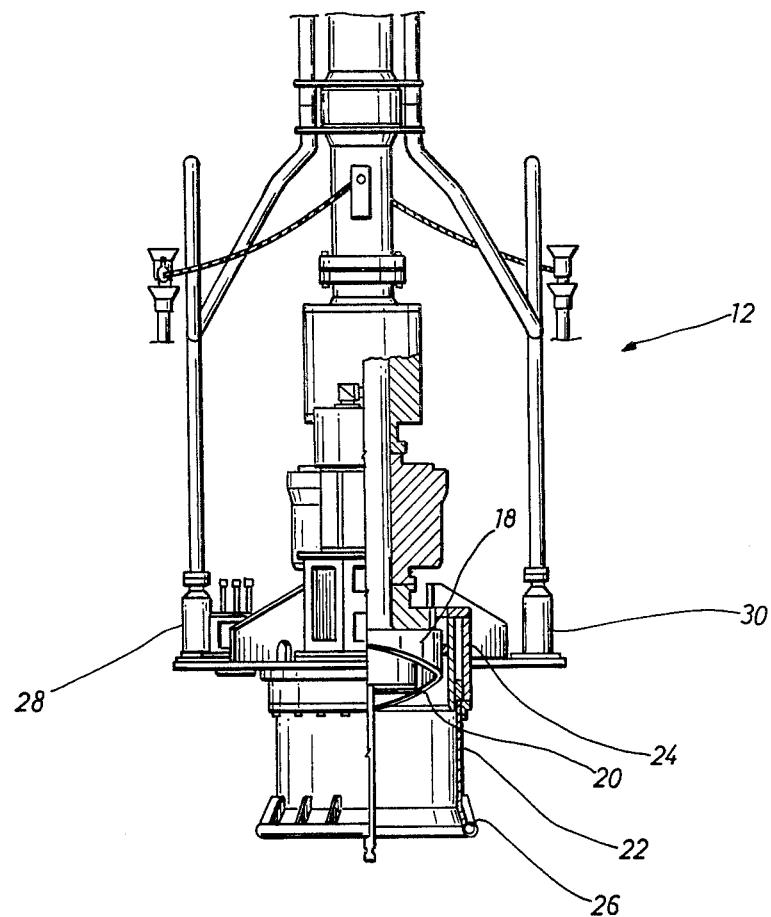
FIG.1
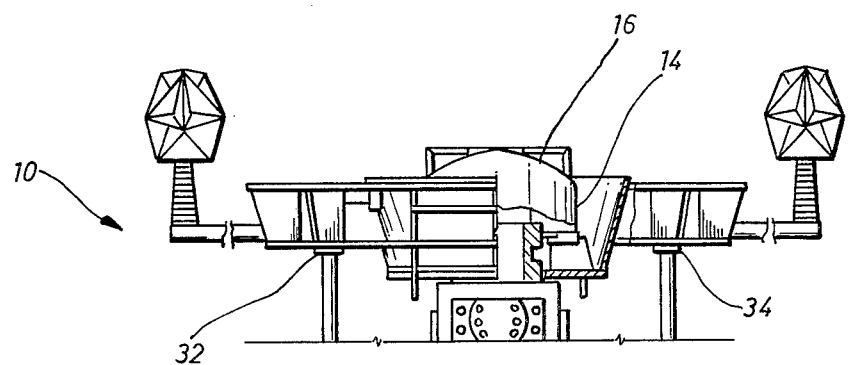

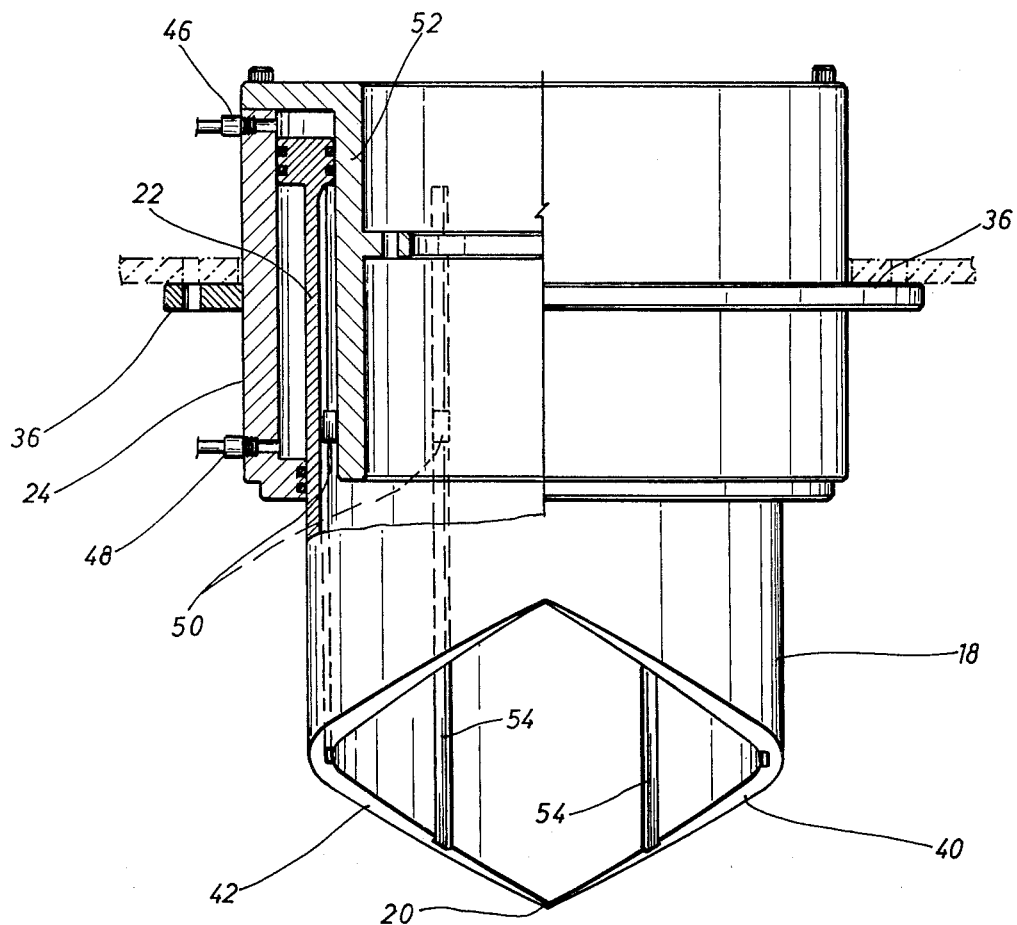
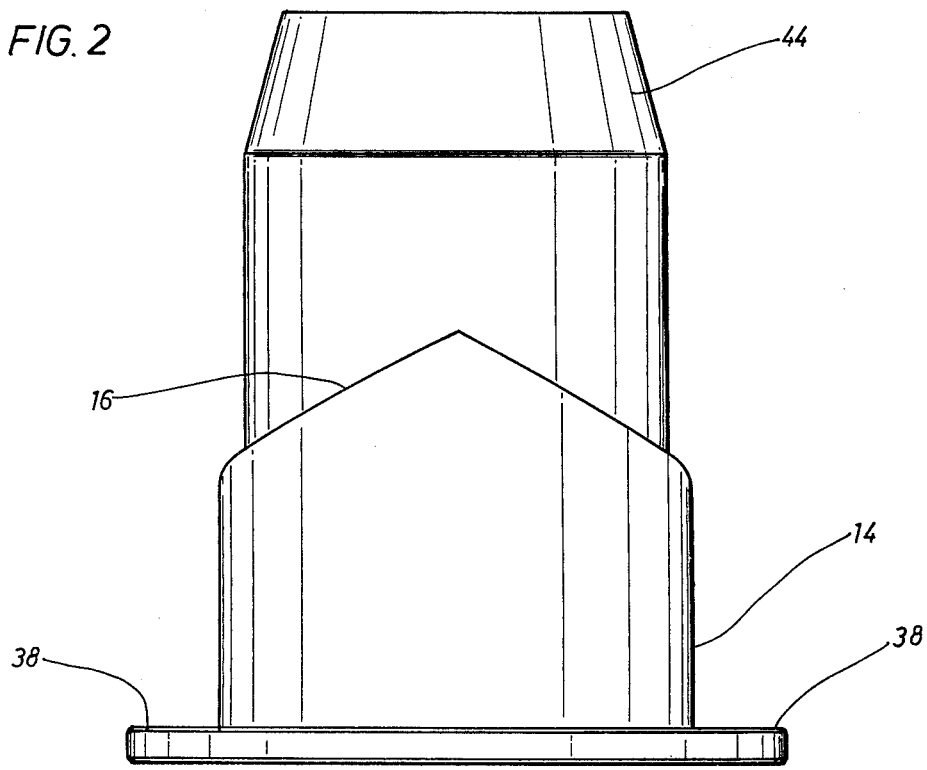
FIG. 2

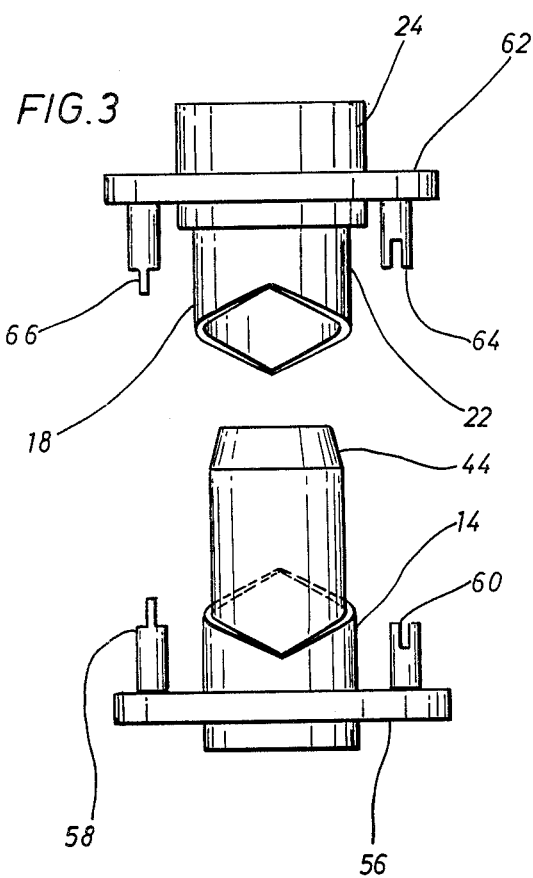
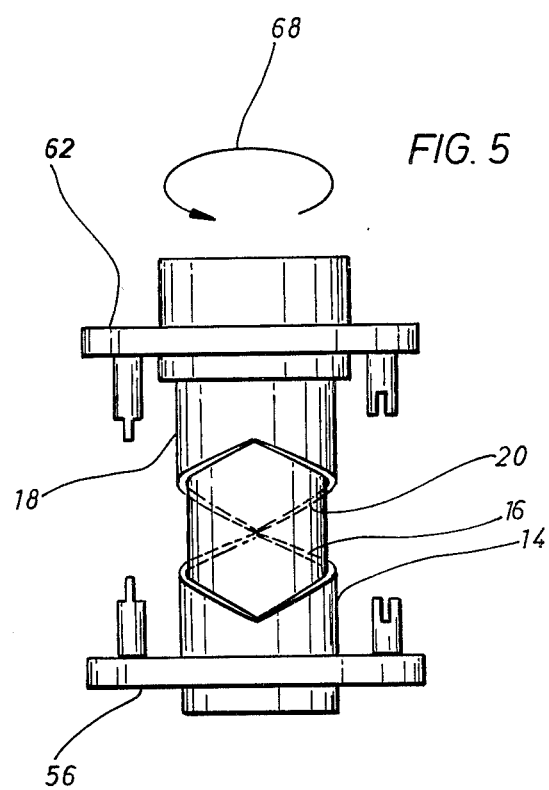
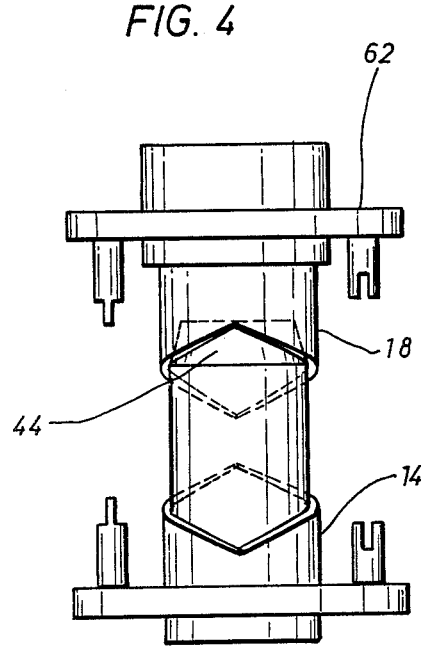
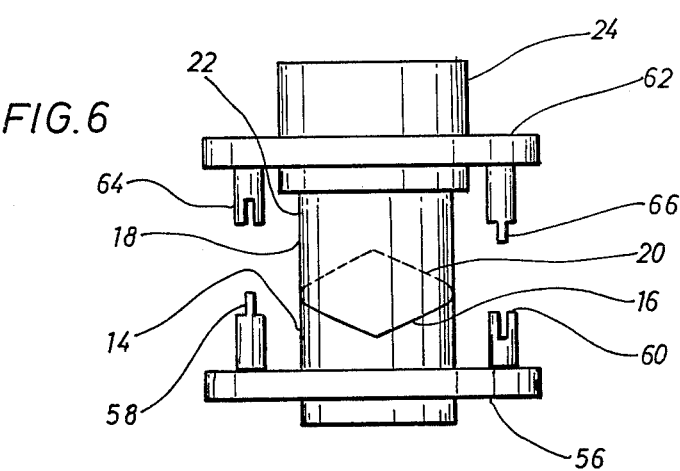
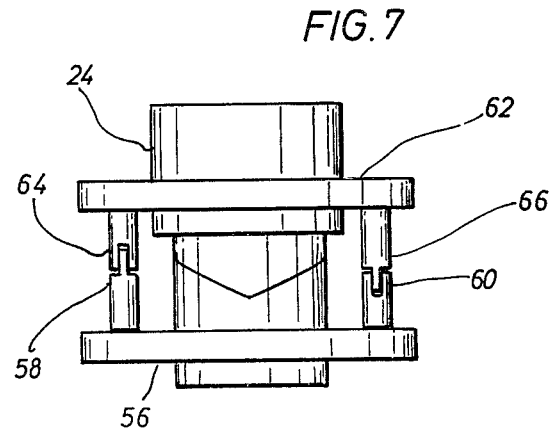

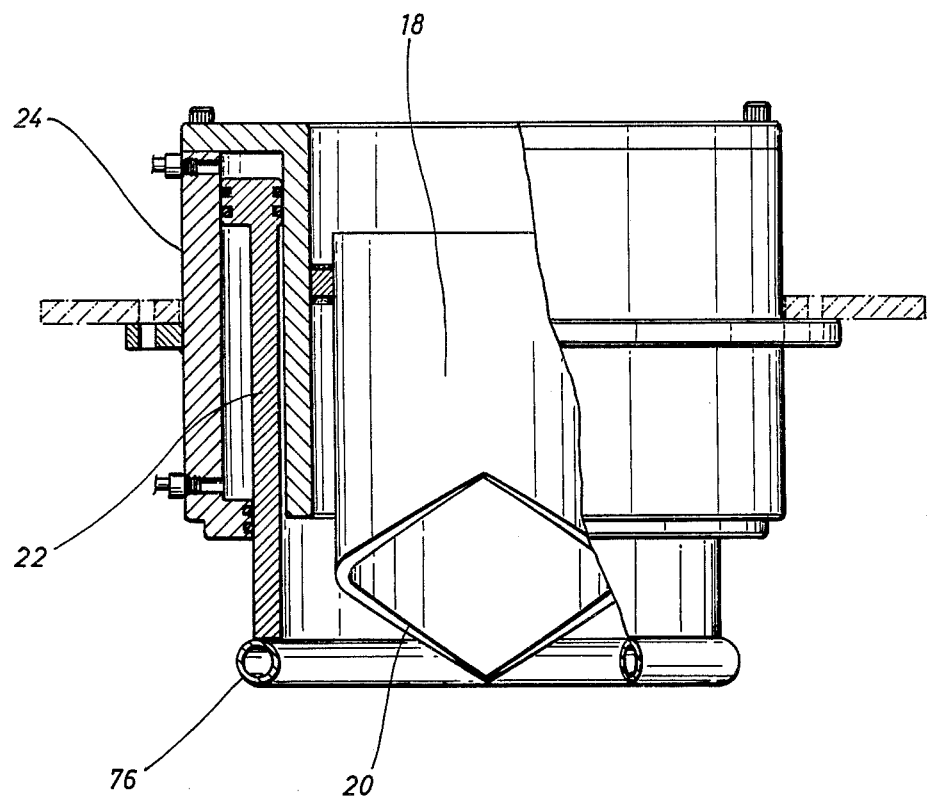
FIG. 9
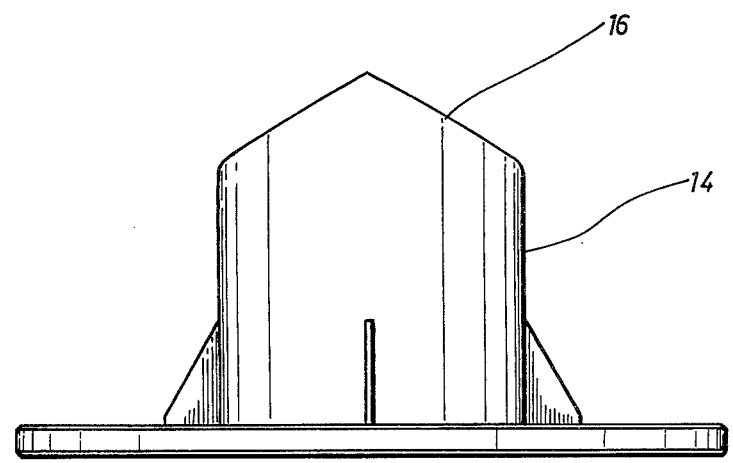

APPARATUS AND METHOD FOR POSITIONING ONE PART RELATIVE TO ANOTHER PART

BACKGROUND OF THE INVENTION

This invention relates to apparatus and methods for positioning and connecting one part relative to another corresponding part of a piece of equipment.

Frequently industrial and other operations must be accomplished at remote locations or in hostile environments. For example, many projects in the area of mineral exploration and production are carried out at considerable depths under bodies of water. In such operations, it is sometimes necessary to connect and disconnect associated pieces of equipment at such remote locations. In the field of oil production, for example, an undersea blowout preventer stack may be located on the ocean floor. Normally a lower riser assembly is connected to the blowout preventer for sealing the well under certain circumstances. Hydraulic lines and other types of lines typically connect the lower riser assembly with surface equipment associated with the well. In some situations, however, it may become necessary to disconnect the surface equipment from the blowout preventer stack. Should a severe storm arise, for example, such a disconnection may be necessary to prevent damage to some of the equipment connecting subsea and surface components of the operation. Thus, it is common in such operations to provide some means for disconnecting the lower riser assembly from the blowout preventer. Many other such situations in different industries and in various remote or hazardous locations can be envisioned which require the connection and disconnection of equipment.

At a subsequent time, when it becomes necessary to reconnect such equipment, it is frequently of crucial importance that the components to be connected be carefully aligned before those components are allowed to contact each other. Otherwise, the necessary connections between certain pieces of equipment might not be properly coupled. In the instance of a blowout preventer and lower riser assembly, for example, typically a number of hydraulic lines must be connected between the components. Furthermore, the weight of the equipment to be reconnected might cause considerable damage to the components if a precise alignment were not achieved before the separate components are allowed to come into contact.

Frequently it is difficult or undesirable to dispatch personnel to such a remote location to manually align and connect such components. Thus, it is necessary to provide some form of automatically or remotely aligning and connecting the components. Various forms of such automatic aligning and coupling means are known. In the undersea oil production industry, for example, a combination of sonar and television systems are frequently used to approximately locate the separate components relative to one another. In this technique a television camera and sonar transmitter mounted on the piece of equipment to be reconnected, such as a lower riser assembly, transmit signals to a surface location, where operators may manipulate connecting equipment, such as a pipe string, to approximately locate the disconnected equipment relative to the associated undersea comoponent, such as a blowout preventer stack.

Once the separate components have thus been approximately aligned, a centering peg or cone or some such device mounted on one of the components is brought into contact with a portion of the second component adapted to receive that device, thereby achieving the axial alignment of the two components. Once axial alignment has been achieved, however, the parts frequently must be rotated to accomplish the proper rotational orientation of one part with respect to the other in order for proper connections to be made between the components.

In one known design, this rotational alignment is accomplished with a device known as a latch bumper head. In this technique, a vertical groove is provided within a cylindrical element which is attached to one component of the equipment, while a second component of the equipment includes a corresponding spring loaded key member. After initial alignment by sonar and television to achieve axial alignment, the component to be connected, such as a lower riser assembly, is rotated about the vertical axis by rotating connected equipment at the surface, such as a pipe string. When the spring loaded key engages the groove provided, the key catches in the groove and rotationally aligns the first component, such as a lower riser assembly, with respect to the second, such as a blowout preventer stack. The components then are allowed to move more closely together so that hydraulic and other connections between the two components may be engaged. In another similar design, after the first and second components are axially aligned, the upper component is again rotated by rotating the connecting equipment at the surface. In the second design, a spring loaded pin is provided on one component. When the components have reached the point of proper rotational alignment, the spring loaded pin drops into a corresponding hole which is provided in the second component, thereby locking the two components into the proper rotational position.

The devices discussed above are capable of accomplishing the desired axial and rotational alignment between two related parts which must be connected. The devices which are known, however, are subject to some disadvantages. These devices, for example, require for their operation the rotation of associated equipment, such as a pipe string, at the surface of the water over the blowout preventer, requiring provisions to be built into such equipment to adapt the equipment to be so turned, and further requiring some powered means at the surface to provide the rotational force. Since a considerable amount of equipment might need to be rotated, this requirement can impose significant costs in additional equipment to be provided for such an operation. Thus, it would be advantageous to provide such an aligning and connecting apparatus which would not require rotation of the surface equipment to achieve automatic rotational alignment and further would not require a powered means at the surface to operate such equipment. In particular, it would be advantageous to provide such an apparatus which is capable of utilizing gravitational forces to motivate the rotational alignment function.

SUMMARY OF THE INVENTION

It is a general object of this invention to provide a new and improved apparatus and method for automatically aligning a first part of equipment relative to a corresponding second part.

It is a feature of this invention to provide an alignment apparatus and method which may also be used to connect and disconnect one part from another while preventing any binding between the parts or damage to the parts.

It is another feature of this invention to provide an apparatus and method for aligning two parts relative to one another which will achieve coaxial alignment and rotational alignment about a longitudinal axis of the parts.

It is an additional feature of this invention to provide an alignment apparatus and method which utilizes gravitational forces to assist in achieving the alignment and connection of one part to a second part.

In one form, the invention includes an alignment apparatus for positioning a second part relative to a first part, comprising a first cylindrical guide and a second cylindrical guide. The first cylindrical guide is adapted to be affixed to the first part and defines at an end thereof a first surface such that the circumferential angle between the surface and the longitudinal axis of the first guide is constant. The second guide is adapted to be mounted upon the second part, and defines at one end a second surface which is substantially identical to the first surface. When the guides are axially aligned and a longitudinal force is applied to bring the first and second surfaces together, a rotational torque results and is thereby applied to the second guide relative to the first guide, the apparatus being thus adapted to rotate the second part relative to the first part to a predetermined rotational position.

In a more particular embodiment, the circumferential angle between the second surface and the longitudinal axis of the second guide is made sufficiently small that gravitational forces will bring the first and second surfaces together and cause sufficient rotational torque to rotate the second guide relative to the first guide when the longitudinal axis of the second guide is substantially vertical.

In another embodiment, an alignment member is affixed to the second guide and includes a projecting portion which is adapted to be received by the first guide, thereby permitting the axial alignment of the first and second guides prior to accomplishing the rotational alignment.

In yet another embodiment, the alignment member is mounted within the first guide and projects through the first surface, the projecting portion of the alignment member being adapted to project through the second surface and be received within the second guide. In an alternative embodiment of the alignment member, the member comprises a guide skirt which is affixed to the exterior of the second guide and projects around and beyond the second surface, the projecting portion of the skirt being adapted to receive structure connected to the first guide, thereby effecting the axial alignment of the guides and affording protection for the surfaces of the guides.

In another embodiment, an aligning and connecting apparatus for positioning and engaging a first part with a second part is provided, including a lower cylindrical guide which is adapted to be affixed to the first part, the lower guide defining at an upper end a lower helical surface which includes a half right hand helical surface and a half left hand helical surface. An upper cylindrical guide defines at a lower end an upper helical surface which is substantially identical to the lower helical surface. An axial alignment member is affixed to and projects from the lower guide, thereby being adapted to engage the upper guide and thus axially align the upper and lower guides. A cylinder is adapted to be affixed to the second part, while a piston affixed to the upper guide and slidably mounted within the cylinder, is adapted to be extended or retracted by the selective application of fluid pressure to the cylinder. In this manner the engagement of the first and second parts may be controlled.

In an alternative embodiment, an alignment apparatus is provided for positioning a first part with respect to a second part, including a lower cylindrical guide which is adapted to be affixed to the first part and defines on an upper end a lower helical surface which includes a half right hand helical surface and a half left hand helical surface. An upper cylindrical guide is adapted to be affixed to the second part and defines at a lower end an upper helical surface which is substantially identical to the lower helical surface. A cylinder is adapted to be affixed to the second part and a piston is slidably mounted within the cylinder and is adapted to be extended and retracted by the selective application of fluid pressure to the cylinder. The piston is further adapted to engage the lower guide and thereby axially align the upper and lower guides.

A method according to the invention is provided for positioning a first part relative to a second part, and includes the steps of:
(1) affixing a first cylindrical guide to the first part, the guide defining at one end a first helical surface,
(2) affixing a second cylindrical guide to the second part, this guide defining at one end a second helical surface substantially identical to the first helical surface,
(3) longitudinally aligning the first guide with the second guide, and
(4) applying a force in the longitudinal direction to cause the first and second surfaces to contact and rotate relative to one another until the first and second surfaces are completely engaged, thereby aligning the first part relative to the second part.

In another embodiment, the method of the invention comprises the steps of:
(1) affixing a first cylindrical guide to the first part, the guide defining at one end a first helical surface,
(2) retractably mounting a second cylindrical guide to the second part, this guide defining at one end a second helical surface which is substantially identical to the first helical surface,
(3) longitudinally aligning the first guide with the second guide,
(4) applying a force in the longitudinal direction to cause the first and second surfaces to contact and rotate relative to one another until the surfaces are completely engaged, thereby aligning the first part relative to the second part, and
(5) retracting the second guide, thus causing the first part to engage the second part.

Examples of the more important features of this invention have thus been broadly outlined in order that the detailed description thereof that follows may be better understood, and in order that the contributions which this invention provides to the art may be better appreciated. There are, of course, additional features of the invention which will be described herein and which will be included within the subject matter of the claims appended hereto.

BRIEF DESCRIPTION OF THE DRAWINGS

Additional objects, features and advantages of the present invention will become apparent with respect to the following detailed description of preferred embodiments thereof in connection with the accompanying drawings, wherein like reference numerals refer to like elements throughout all the figures. In the drawings:

FIG. 1 is a side profile view in partial cutaway illustrating an embodiment of the invention as it is mounted to two corresponding parts of equipment which are to be connected.

FIG. 2 is a side profile view in partial cutaway illustrating one embodiment of the invention.

FIGS. 3-7 illustrate in side profile views the configuration of the invention illustrated in FIG. 2 and representations of the parts to which it is attached, at various stages in an aligning and connecting operation.

FIG. 9 illustrates in side profile view a second alternative embodiment of the invention.

DESCRIPTION OF THE PREFERRED EMBODIMENT

Figure 8:
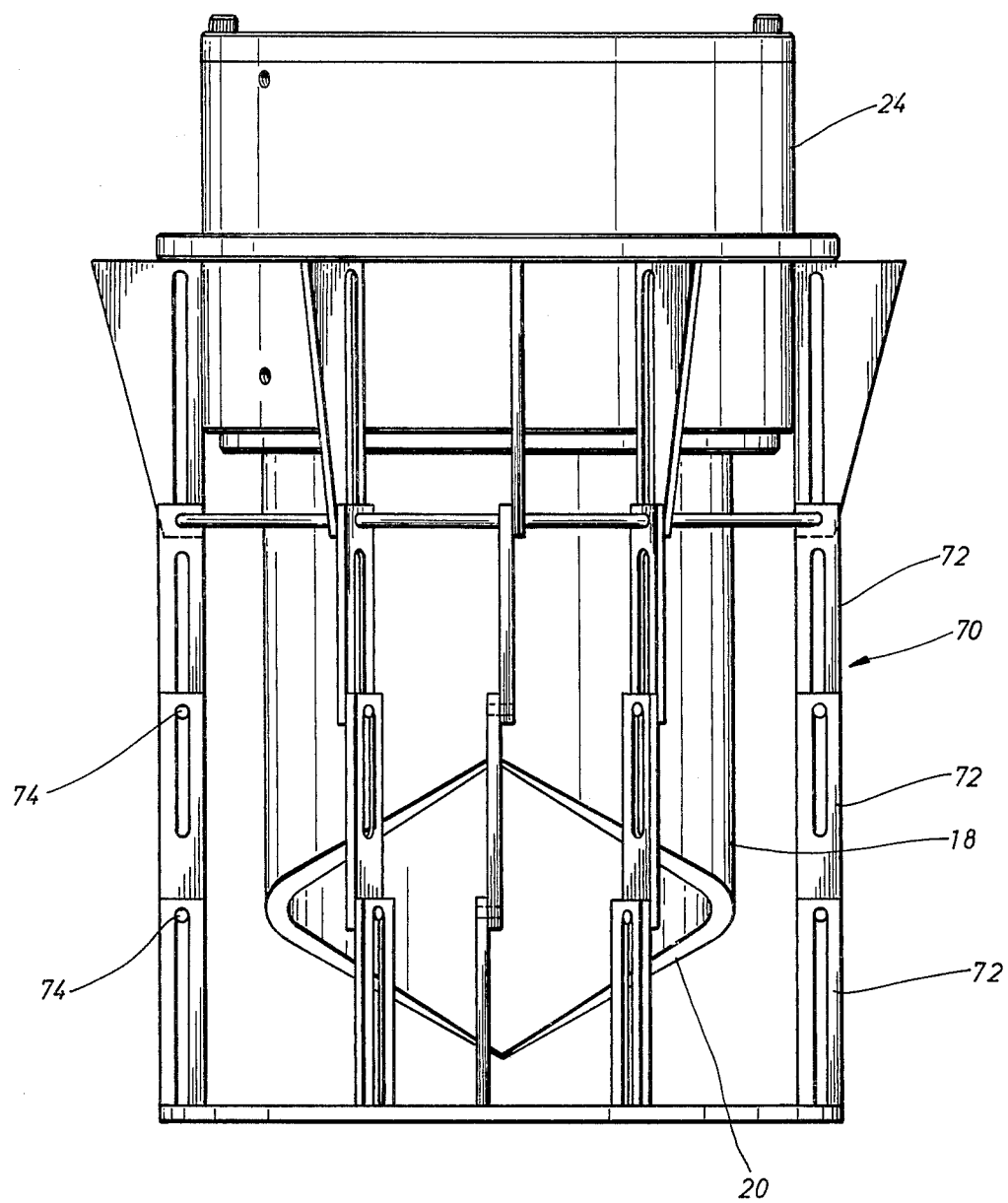
FIG. 8 illustrates in side profile view an alternative embodiment of the invention.

Referring first to FIG. 1, an illustration of one embodiment of this invention is provided showing the invention in use in a particular environment. In FIG. 1, a blowout preventer stack generally illustrated by the numeral 10 is resting on the seabed (not shown). A lower riser assembly 12 is illustrated as it has been located over the blowout preventer 10 and in position to be aligned with and connected to the blowout preventer. The lower riser assembly typically will be lowered to this position from the surface, with the aid of sonar and television devices mounted on the assembly.

The various parts of the aligning apparatus of this invention are shown affixed to the blowout preventer 10 and the lower riser assembly 12. The components of the aligning apparatus have been attached to the equipment prior to the installation of the blowout preventer and arranged such that when the aligning apparatus if fully engaged, the blowout preventer 10 and the lower riser assembly 12 are properly positioned to be attached and connected together. A lower cylindrical guide 14, which includes on an upper end a lower helical surface 16, is affixed to the blowout preventer stack 10. An upper cylindrical guide 18, which includes an upper helical surface 20 on a lower end, is affixed to the lower riser assembly 12. A piston 22 is slidably mounted within a cylinder 24, the cylinder being rigidly affixed to the lower riser assembly 12. Attached to the lower end of the piston 22 is a guide skirt 26.

As the lower riser assembly 12 is lowered toward the blowout preventer 10, with the piston 22 extended from cylinder 24 by suitable hydraulic means (not shown), the guide skirt 26 provides means for axially aligning the blowout preventer and the lower riser assembly. After the guide skirt 26 has seated on the blowout preventer stack 10, the hydraulic means is actuated to retract the piston 22, thereby allowing the weight of assembly 12 to cause the upper helical surface 20 of upper cylindrical guide 18 to contact the lower helical surface 16 of lower cylindrical guide 14. As the upper and lower surfaces come into contact, the force of gravity upon the angled point of contact causes a rotational torque to be applied to the lower riser assembly 12 relative to the blowout preventer 10. This rotational torque in turn causes the rotation of the lower riser assembly 12 until that assembly is in proper rotational alignment with respect to the blowout preventer 10, as has been prearranged by the orientation of guides 14 and 18 on blowout preventer 10 and lower riser assembly 12, respectively. At this point, the upper connections 28 and 30 on assembly 12 are in proper position to engage with the corresponding lower connections 32 and 34 on blowout preventer 10. Suitable hydraulic controls may then be activated to cause upper connections 28 and 30 to extend into and sealingly engage the lower connections 32 and 34, respectively.

In this manner the blowout preventer 10 and the lower riser assembly 12 may be remotely aligned and connected without the necessity for providing a rotational alignment torque from the surface. Thus the bulk, expense, and complication of the equipment required for such an aligning and connecting operation may be significantly reduced through the use of the alignment apparatus of this invention. Although the specific equipment illustrated is concerned with undersea production and exploration operations, it will be readily understood by those skilled in the art that the present invention is very broad in the scope of its potential application, not being limited, for example, to the energy industries nor to undersea environments. It is possible to envision, for example, other beneficial applications in oceanographic research and outer space exploration.

Now referring to FIG. 2, a second embodiment of the invention is shown in detail in a side view including a partial cross section. This embodiment is capable of not only aligning two associated components of equipment, but also then bringing the components into engagement to accomplish all necessary connections in the equipment. In this embodiment, a lower cylindrical guide 14, including a lower helical surface 16, is provided for attachment to the lower part of the two component parts to be assembled. In this embodiment, upper cylindrical guide 18, including an upper helical surface 20, forms the lower portion of a piston 22, which is slidably mounted within a cylinder 24. The upper and lower guide structures are provided with suitable attachment points for affixing to the upper and lower parts to be attached, as at points 36 and 38, respectively. As mentioned above, the components of the alignment apparatus are attached to the parts to be aligned with an orientation such that the parts will be properly aligned, both axially and rotationally, when the upper and lower guides are mated.

The upper helical surface 20 defines an important surface which is formed with a constant angle. That is, the circumferential angle, i.e., the angle measured tangent to the cylindrical guide 18, between the surface 20 and the longitudinal axis of the guide is constant for any point on that surface. Furthermore, the surface 20 is divided into a first half surface 40 and a second half surface 42. The circumferential angle between the half surface 40 and the longitudinal axis of the guide 18 is positive, while the circumferential angle between the half surface 42 and the longitudinal axis of the upper guide 18 is negative, the absolute value of the latter two angles being equal to the same constant. In this manner, the upper helical surface 20 defines a half right hand helix and a half left hand helix. The lower helical surface 16 is identical in shape to the upper helical surface 20. Thus, when the two surfaces oppose each other and are in axial alignment, there is only one rotational position of the upper surface relative to the lower surface in which the two surfaces may make a complete mating contact. It is because of this feature that the aligning apparatus of this invention provides one unique alignment position out of a possible 360 degrees of rotation. A surface with a single right hand (or left hand) helix for a full 360° of rotation would also provide one unique alignment position about an axis and should also be considered within the scope of this invention. The embodiment illustrated, however, which incorporates a half right hand and a half left hand helix, is considered to be the preferred embodiment of the invention.

While helical surfaces are preferred for the cylindrical guides of this invention, other shapes may be envisioned which are within the scope of this invention. In general, the upper surface may be of any curvilinear shape which will produce a rotational force or torque when the upper guide is brought into contact with a lower guide having an identically or substantially identically shaped surface. Thus, for example, it is conceivable that in some applications the circumferential angle of the surface might be arranged to vary so that the amount of torque produced by the contacting surfaces will vary depending upon the relative rotational positions of the two guides. Such other shapes are also considered within the scope of this invention although, as mentioned above, the preferred embodiment of the invention utilizes helically shaped surfaces. Now continuing with the description of the embodiment illustrated in FIG. 2, an alignment member in the form of an alignment cone 44 is affixed to and projects from the lower cylindrical guide 14. This alignment cone functions to provide initial axial alignment between the lower cylindrical guide 14 and the upper cylindrical guide 18 before rotational alignment is accomplished, as discussed in more detail herein in connection with FIGS. 3–7.

Also provided in the apparatus illustrated in FIG. 2 are fluid ports 46 and 48 which communicate with cylinder 24 and permit the application of hydraulic fluid to extend and retract piston 22, respectively. The operation of the hydraulic apparatus for extending and retracting the piston 22 may be accomplished according to conventional techniques and therefore is not described herein in any detail. Keys 50 are secured to an inner cylinder 52, which in turn is rigidly affixed to cylinder 24. The keys 50 ride in slots 54 provided in the inner wall of the piston 22. In this manner, relative rotation is prevented between piston 22 and cylinder 24. When the cylinder 24 is attached to an upper part of equipment, relative rotation is thus prevented between the upper helical surface 20 and the upper part to be aligned so that alignment of the parts is directly related to the alignment of the helical surfaces.

In order to more fully understand the operation of the apparatus and method of this invention, reference may be had to FIGS. 3–7, which illustrate the sequence of operation in which the alignment apparatus of FIG. 2 may be utilized to axially and rotationally position a lower part relative to an upper part and engage the connecting members between those parts. Referring first to FIG. 3, the lower guide 14 is shown affixed to a representative illustration of a lower part 56, which in turn includes lower couplings 58 and 60. The upper cylindrical guide 18 is shown affixed to a representative illustration of an upper part 62, which includes upper couplings 64 and 66, which must mate with lower couplings 58 and 60, respectively. In FIG. 3, the upper part 62 is shown approximately aligned with the lower part 56, and spaced above the lower part. The upper part may be thus located and aligned by utilizing television and sonar transmitters mounted on the upper part, which transmit signals to the surface where operators may position surface equipment attached to the upper part 62 to bring the upper part 62 and the attached upper guide 18 into the approximate location shown with respect to the lower part 56 and the attached lower guide 14.

The piston 22 is initially maintained in the extended position. Once the upper guide 18 is thus approximately centered over the lower guide 14, the upper part 62 is further lowered, as illustrated in FIG. 4, until the alignment cone 44 engages the interior of the upper cylindrical guide 18. At this point, the alignment cone 44 has functioned to axially align the upper and lower parts with respect to the longitudinal axis of the guides 18 and 14.

Now referring to FIG. 5, the upper part 62 and the attached guide 18 are further lowered until the upper helical surface 20 contacts the lower helical surface 16. Due to the angular configuration of the helical surfaces, this contact, in conjunction with the force of gravity exerted by the weight of the upper part 62, will cause a rotational torque to be exerted on the upper guide 18 and the attached upper part 62 relative to the lower guide 14 and the attached lower part 56. This rotational torque will in turn cause a rotation of the upper part 62 relative to the lower part 56, as indicated by the arrow 68. The angle of the helical surfaces must be sufficiently steep to permit the gravitational forces to overcome the coefficient of friction between the helical surfaces 16 and 20. It has been found in one particular application of this invention that an angle of approximately 16° from horizontal (equivalent to an angle of approximately 74° with respect to the longitudinal axis of the guides 14 and 18) will allow the apparatus to work properly under the influence of gravitational forces.

The rotational torque thus produced will cause the upper part 62 to continue to rotate relative to the lower part 56 until the upper and lower surfaces 20 and 16 are completely mated, as illustrated in FIG. 6. The position in which the upper guide 18 is affixed to the upper part 62, and the position in which the lower guide 14 is affixed to the lower part 56, are arranged so that when the upper and lower surfaces 20 and 16 are fully mated, the upper couplings 64 and 66 are properly positioned directly above the corresponding lower couplings 58 and 60, as illustrated in FIG. 6. Up to this point in the aligning operation, the piston 22 has been maintained in the extended position with respect to the cylinder 24. Because of this extended position, the upper couplings are separated from the lower couplings so that the positioning of the upper and lower parts may be accomplished by relative rotation of the parts without contacting and damaging the couplings.

Once the proper axial alignment and rotational alignment have been accomplished, as illustrated in FIG. 6, conventional hydraulic means is actuated to retract the piston 22 into the cylinder 24. As the piston retracts into the cylinder, the upper couplings 64 and 66 contact the respective lower couplings 58 and 60, as illustrated in FIG. 7. Thus, for example, the engagement points illustrated might form couplings for hydraulic lines communicating from surface equipment to a blowout preventer stack, which might include lower part 56. In this manner, once the piston 22 is hydraulically actuated and retracted into the cylinder 24, the upper and lower couplings are automatically connected with fluid tight seals.

In the event that the upper and lower parts 62 and 56 should subsequently require disengagement, the apparatus of FIG. 2 provides a convenient and reliable way in which to disconnect the upper and lower parts such that any damage to connections, such as the upper and lower couplings of FIGS. 3–7, may be avoided. To disengage the parts, the piston 22 is hydraulically actuated and extended from the cylinder 24. As the piston is extended, the upper part 62 is raised away from the lower part 56, disengaging the upper couplings 64 and 66 from the lower couplings 58 and 60. Once the piston 22 is fully extended, the upper and lower parts will be completely disengaged, and the upper part 62 may then be removed to the surface without fear of any contact between the upper and lower parts which might cause damage.

Now referring to FIG. 8, an alternative embodiment of the upper cylindrical guide 18 of this invention is illustrated which is designed to afford additional protection to the upper and lower guides and helical surfaces. In this embodiment, a telescoping guide skirt 70 is affixed to the upper guide structure around the exterior of cylinder 24 and surrounds the upper cylindrical guide 18 and the upper helical surface 20. The telescoping guide skirt 70 thus acts to protect the upper cylindrical guide and the upper helical surface from damage due to contact with other objects. The skirt 70 is comprised of telescoping members 72 which are linked by connecting pins 74. When an upper part to which the guide is attached is lowered onto a lower part, the telescoping construction of the skirt 70 permits the skirt to compress as the helical surfaces of the guides engage to accomplish rotational alignment. The skirt 70 may also be arranged to perform the alignment function which is accomplished by alignment cone 44 in the embodiment illustrated in FIG. 2.

In order to align the upper guide with a corresponding lower guide (not shown in FIG. 8) the telescoping guide skirt 70 is sized to engage the exterior structure of the lower guide, thus enabling the axial alignment of the upper and lower guides before the upper and lower helical surfaces are brought into contact to effect rotational positioning.

FIG. 9 illustrates an alternative embodiment of the alignment apparatus of this invention. This corresponds to that illustrated in FIG. 1 in connection with the actual piece of equipment on which the apparatus may be utilized. In this embodiment, a lower cylindrical guide 14, including a lower helical surface 16, is adapted to be attached to a lower part of two parts of equipment to be aligned. An upper cylindrical guide 18, including an upper helical surface 20, is rigidly attached to an upper part. A cylinder 24 is also affixed to the upper part, and includes therein a piston 22, which is adapted to be extended and retracted with respect to the cylinder by hydraulic actuation. In the embodiment of FIG. 9, the piston 22 includes at the lower end thereof an alignment ring 76, which is utilized to achieve axial alignment of the upper and lower cylindrical guides prior to rotational positioning.

To achieve the positioning of a lower part relative to a upper part, using this embodiment of the invention, the upper cylindrical guide 18 is first approximately located above the lower cylindrical guide 14 utilizing television and sonar or any other approximate locating method known to those skilled in the art. The piston 22 is then extended from the cylinder 24. With the piston in the extended position, the upper part is lowered until the alignment ring 76 engages the exterior surface of the lower cylindrical guide 14. In this manner, the alignment ring 76 is utilized to axially align the upper and lower cylindrical guides. The piston 22 is then retracted into cylinder 24, this retraction allowing the upper helical surface 20 to contact the lower helical surface 16. As the surface 16 is contacted, the force of gravity acting on the weight of the upper part causes a rotational torque of the upper part relative to the lower part. This rotational torque, in turn, causes the upper part to rotate relative to the lower part until the upper and lower helical surfaces are completely engaged, at which point the upper and lower parts are in exact alignment.

In the embodiment of FIG. 9, the alignment apparatus does not include a provision for automatically engaging the couplings between the upper and lower parts. Thus, after the alignment apparatus has been used to axially and rotationally position the upper and lower parts, the respective engagement points between the upper and lower parts may be connected by any other convenient means. Typically, for example, such connections may be telescopically mounted and hydraulically actuated to properly engage after the alignment apparatus of FIG. 9 has been utilized to exactly position an upper part relative to a lower part.

Although typical embodiments of the present invention have been illustrated and discussed herein, further modifications and alternative embodiments of the apparatus and method of this invention will be apparent to those skilled in the art in view of this description. Accordingly, this description is to be construed as illustrative only and is provided for the purpose of teaching those skilled in the art the manner of constructing the apparatus and carrying out the method of the invention. It is to be understood that the forms of the invention shown and described herein are to be considered as the presently preferred embodiments. Various changes may be made in the configurations, sizes, and arrangements of the parts, as will be recognized by those skilled in the art. For example, equivalent elements might be substituted for those illustrated and described herein, parts or connections might be reversed or otherwise interchanged, and certain features of the invention may be utilized independently of the use of other features, all as will be apparent to one skilled in the art after receiving the benefit attained through reading the foregoing description of the invention.

We claim:

1. An alignment apparatus for rotationally positioning a second part relative to a first part comprising:

a first cylindrical guide adapted to be affixed to said first part, said first guide defining at an end thereof a first curvilinear surface; and a second cylindrical guide adapted to be mounted on said second part, said second guide defining at an end thereof a second surface substantially identical to said first surface, said first and said second surfaces each being adapted to engage one with the other in a complete mating contact only when said surfaces occupy one rotational position relative to each other;

said first and said second surfaces each being arranged such that when said guides are axially aligned and a longitudinal force is applied to bring said first and second surfaces together, a torque will be applied to said second guide relative to said first guide, said apparatus thereby being adapted to rotate said second part relative to said first part.

2. The apparatus of claim 1 wherein said first surface is defined such that the magnitude of the circumferential angle between said surface and the longitudinal axis of said first guide is constant for any point on said surface.

3. The apparatus of claim 2, wherein said first surface further comprises:
a first half surface such that the circumferential angle between said surface and the longitudinal axis of said first guide is positive; and
a second half surface such that the circumferential angle between said surface and the longitudinal axis of said first guide is negative.

4. The apparatus of claim 1, further comprising:
a cylinder affixed to said second part; and
a piston slidably mounted within said cylinder and adapted to engage said first guide, said piston being adapted to be extended and retracted,
thereby providing for the axial alignment of said guides when said piston is extended and providing for the rotation of said second part relative to said first part when said piston is retracted.

5. The apparatus of claim 4 further comprising an alignment ring disposed on the end of said piston.

6. The apparatus of claim 4 wherein each of said surfaces are defined such that the magnitude of the circumferential angle between each surface and the longitudinal axis of the guide with which it is associated is constant.

7. The apparatus of claim 1, further comprising:
a cylinder affixed to said second part; and
a piston slidably mounted within said cylinder and affixed to said second guide, said piston being adapted to be extended and retracted,
thereby providing for the rotation of said second part relative to said first part when said piston is extended and providing for the engagement of said parts when said piston is retracted.

8. The apparatus of claim 7, further comprising:
an alignment member affixed to said second guide and having a projecting portion adapted to receive said first guide, thereby effecting the axial alignment of the first and second guides.

9. The apparatus of claim 8, wherein said alignment member comprises:
a guide skirt affixed to the exterior of said second guide and projecting around and beyond said second surface, the projecting portion of said skirt being adapted to receive said first cylindrical guide, thereby effecting the axial alignment of said guides and affording protection for said surfaces.

10. The apparatus of claim 8 wherein each of said surfaces are defined such that the magnitude of the circumferential angle between each surface and the longitudinal axis of the guide with which it is associated is constant.

11. The apparatus of claim 7, further comprising:
an alignment member mounted within said first guide and projecting through said first surface, the projecting portion of said member being adapted to project through said second surface and be received within said second guide.

12. The apparatus of claim 11 wherein said alignment member comprises a substantially cylindrical member having an alignment cone at the end thereof.

13. The apparatus of claim 11 wherein each of said surfaces are defined such that the magnitude of the circumferential angle between each surface and the longitudinal axis of the guide with which it is associated is constant.

14. An aligning and connecting apparatus for positioning and engaging a first part with a second part, comprising:
a lower cylindrical guide adapted to be affixed to said first part, said lower guide defining at an upper end thereof a lower helical surface, said surface including a half right hand helical surface and a half left hand helical surface;
an upper cylindrical guide defining at a lower end thereof an upper helical surface which is substantially identical to said lower helical surface;
an axial alignment member affixed to and projecting from said lower guide, said member being adapted to engage said upper guide and thereby axially align said guides;
a second half surface such that the circumferential angle between said surface and the longitudinal axis of said first guide is negative.

15. An aligning apparatus for positioning a first part with respect to a second part, comprising:
a lower cylindrical guide adapted to be affixed to said first part, said lower guide defining at an upper end thereof a lower helical surface, said surface including a half right hand helical surface and a half left hand helical surface;
an upper cylindrical guide adapted to be affixed to said second part, said upper guide defining at a lower end thereof an upper helical surface which is substantially identical to said lower helical surface;
a cylinder adapted to be affixed to said second part; and
a piston slidably mounted within said cylinder and adapted to be extended and retracted, said piston being further adapted to engage said lower guide and thereby axially align said upper and lower guides.

16. A method for positioning a first part relative to a second part, comprising the steps of:
affixing a first cylindrical guide to the first part, said guide defining at an end thereof a first helical surface;
affixing a second cylindrical guide to the second part, said guide defining at an end thereof a second helical surface substantially identical to said first helical surface;
longitudinally aligning the first guide with the second guide;
applying a force in the longitudinal direction to cause the first and second surfaces to contact and rotate relative to one another until the first and second surfaces are completely engaged, thereby aligning the first part relative to the second part.

17. The method of claim 16 wherein said force is a gravitational force.

18. A method for positioning and engaging a first part relative to a second part, comprising the steps of:
affixing a first cylindrical guide to the first part, the guide defining at one end thereof a first helical surface;
retractably mounting a second cylindrical guide to the second part, the guide defining at one end thereof a second helical surface substantially identical to the first helical surface;

longitudinally aligning the first guide with the second guide;

applying a force in the longitudinal direction to cause the first and second surfaces to contact and rotate relative to one another until the surfaces are completely engaged, thereby aligning the first part relative to the second part; and retracting the second guide, thereby causing the first part to engage the second part.

19. The apparatus of claim 1 wherein said second surface is defined such that the magnitude of the circumferential angle beteen said surface and the longitudinal axis of said second guide is constant for any point on said surface.

20. The apparatus of claim 19, wherein said second surface further comprises:

a first half surface such that the circumferential angle between said surface and the longitudinal axis of said second guide is positive; and a second half surface such that the circumferential angle between said surface and the longitudinal axis of said second guide is negative.

21. An alignment apparatus for positioning a second part relative to a first part, comprising:

a first cylindrical guide adapted to be affixed to said first part, said first guide defining at an end thereof a first curvilinear surface;

a second cylindrical guide adapted to be mounted on said second part, said second guide defining at an end thereof a second surface substantially identical to said first surface;

a cylinder affixed to said second part; and a piston slidably mounted within said cylinder and adapted to engage said first guide, said piston being adapted to be extended and retracted, said first and second surfaces being arranged such that when said piston is extended said guides are axially alignable and when said piston is retracted the application of a longitudinal force brings said first and second surfaces into contact to apply a torque of said second guide relative to said first guide, said apparatus thereby being adapted to rotate said second part with respect to said first part.

22. An alignment apparatus for positioning a second part relative to a first part, comprising:

a first cylindrical guide adapted to be affixed to said first part, said first guide defining at an end thereof a first curvilinear surface;

a second cylindrical guide adapted to be mounted on said second part, said second guide defining at an end thereof a second surface substantially identical to said first surface;

a cylinder affixed to said second part; and, a piston slidably mounted within said cylinder and affixed to said second guide, said piston being adapted to be extended and retracted;

said first and second surfaces being arranged such that when said piston is extended the application of a longitudinal force brings said first and second surfaces into contact to apply a torque to rotate said second part relative to said first part and when said piston is retracted said second part is engageable with said first part.

23. The apparatus of claim 22, further comprising:

an alignment member affixed to said second guide and having a projecting portion adapted to receive said first guide, thereby effecting the axial alignment of the first and second guides.

24. The apparatus of claim 22, further comprising:

an alignment member mounted within said first guide and projecting through said first surface, the projecting portion of said member being adapted to project through said second surface and be received within said second guide.

25. The apparatus of claim 23, wherein said alignment member comprises:

a guide skirt affixed to the exterior of said second guide and projecting around and beyond said second surface, the projecting portion of said skirt being adapted to receive said first cylindrical guide, thereby effecting the axial alignment of said guides and affording protection for said surfaces.

* * * * *